3,753,995
PROCESS AND INTERMEDIATES IN THE
PREPARATION OF EBURNAMONINE
Jacques Martel, Bondy, and Germain Costerousse, Montrouge, France, assignors to Roussel-UCLAF, Paris, France
No Drawing. Filed Dec. 28, 1971, Ser. No. 213,215
Claims priority, application France, Jan. 6, 1971, 7100204
Int. Cl. C07d 57/08
U.S. Cl. 260—293.53   6 Claims

ABSTRACT OF THE DISCLOSURE

The object of this invention is a new process of preparation of (±) eburnamonine of the formula:

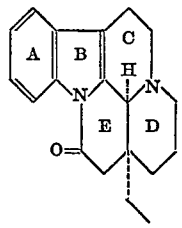

It is known that eburnamonine has been isolated from several plant species such as Vinca minor and Hunteria Eburnea.

Eburnamonine possesses interesting pharmacological properties; it provokes a hypertension accompanied by a respiratory and cardiac stimulation and an increase of tonicity.

In addition, eburnamonine can serve as starting material in the synthesis of known analogous compounds displaying an interesting physiological activity.

---

The object of this invention is the synthetic preparation of pure eburnamonine which does not require starting material of plant origin, whose supply is often onerous and uncertain.

Processes for the total synthesis of eburnamonine are known (see, among others, on this subject Bartlett et al., J. Am. Chem. Soc. 82, 5941 (1960)) but these processes, which require separation of stereo-isomers, do not allow for a sufficient product yield and as a result of this inconvenience they cannot be used easily in industrialization.

The process of the present invention avoids precisely this type of inconvenience.

This process is essentially characterized by the condensation of an alkyl 5-halovalerate of the general Formula I:

$$X-(CH_2)_4-CO_2R_1 \quad (I)$$

in which X represents a chlorine or bromine atom and $R_1$ represents an alkyl radical containing from 1 to 4 carbon atoms with tryptamine in the presence of a basic agent in alcohol; the submission of the resulting N-[β-(3'-indolyl) ethyl] 2-oxo piperidine of general Formula II:

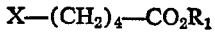

to the action of a dehydrating agent in the presence of an organic base, then to the action of a strong acid of the type HX', X' representing an anion selected from $ClO_4^\ominus$, $Cl^\ominus$, $Br^\ominus$ to obtain the corresponding salt of 1,2,3,4,6,7-hexahydro-12H-indolo [2,3a] quinolizinium of general Formula III:

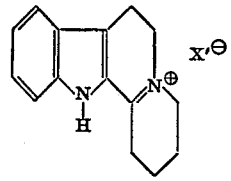

that is treated with a mineral base to obtain 2,3,4,6,7,12-hexahydro indolo [2,3a] quinolizine of general Formula IV:

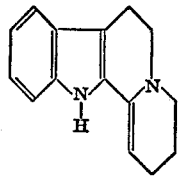

This compound is submitted to the action of dibenzoyl peroxide in the presence of hydroquinone, then the resultant compound is submitted to the action of a mineral base to obtain 1-benzoyloxy 2,3,4,6,7,12-hexahydro indolo [2,3a] quinolizine of general Formula V:

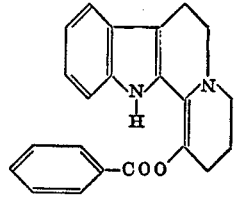

which is treated, in the presence of a basic agent, with a phosphonoacetic ester of general Formula VI:

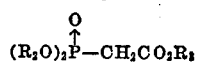

in which $R_2$ and $R_3$, identical or different, represent an alkyl radical containing from 1 to 4 carbon atoms to obtain an alkyl 1,2,3,4,6,7,12,12b E octahydro indolo [2,3a] quinolizylidene acetate of general Formula VII:

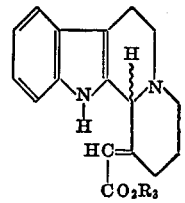

which is treated with an ethyl-magnesium halide in the presence of cuprous chloride to obtain (±) eburnamonine.

It should be noted that the salts with strong acids of 1,2,3,4,6,7-hexahydro 12H-indolo [2,3a] quinolizinium and particularly the perchlorate of the 2,3,4,6,7,12-hexahydro indolo [2,3a] quinolizine intermediaries of the process of the invention are described in the literature [Wenkert et al., J. Am. Chem. Soc. 84, 4914 (1962); Morrison et al., J. Org. Chem. 29, 2771 (1964), and Dolby et al., J. Org. Chem. 32, 1391 (1967)] but the methods of obtaining these compounds are different from those of the process of the present invention. What is more, they require a high number of stages, higher than in the process of the present invention, resulting in an appreciable difference in yields which reflect on the whole of the synthesis.

The process for the preparation of the 1,2,3,4,6,7-hexahydro 12H-indolo [2,3a] quinolizinium acid salt of a strong acid is characterized by the condensation of an alkyl 5-halovalerate of general Formula I:

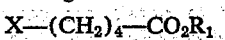

in which X represents a chlorine or bromine atom and R₁ represents an alkyl residue containing from 1 to 4 carbon atoms, with tryptamine in the presence of a basic agent in alcohol; submission of the resultant N-[β-(3'-indolyl)ethyl] 2-oxo piperidine of general Formula II:

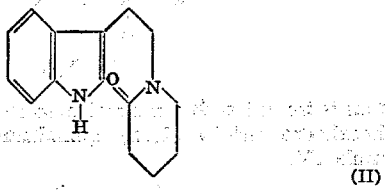

to the action of a dehydrating agent in the presence of an organic base, then the action of a strong acid of type HX', X' representing an anion selected from ClO⊖, Cl⊖, Br⊖ to obtain the desired compound.

The process for preparing (±) eburnamonine is characterized by the subjection of 2,3,4,6,7,12-hexahydro indolo [2,3a] quinolizine of general Formula IV:

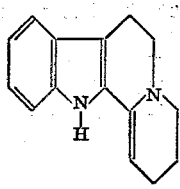

to the action of dibenzoyl peroxide in the presence of hydroquinone, then the submission of the resultant compound to the action of a mineral base to obtain 1-benzoyloxy 2,3,4,6,7,12-hexahydro indolo [2,3a] quinolizine of general Formula V:

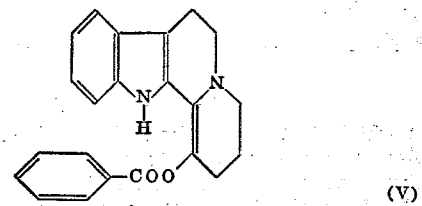

which is treated, in the presence of a basic agent, with a phosphono-acetic ester of general Formula VI:

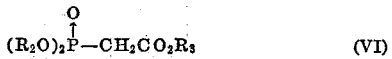

in which R₂ and R₃, identical or different, represent an alkyl radical containing from 1 to 4 carbon atoms, to obtain an alkyl 1,2,3,4,6,7,12,12b E octahydro indolo [2,3a] quinolizylidene acetate of general Formula VII:

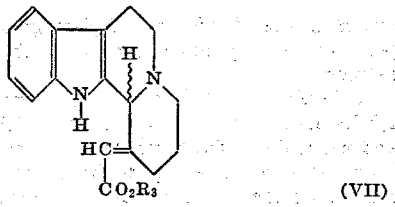

which is then treated with an ethyl-magnesium halide in the presence of cuprous chloride to afford the desired compound.

In an operational method now preferred the alkyl 5-halovalerate that is condensed on tryptamine is ethyl bromovalerate; this reaction is effected in the presence of potassium carbonate in butanol; one can also use as a basic agent other alkaline carbonates such as sodium carbonate, or even alcoholates such as sodium t-butylate, or an alkaline metal hydroxide such as sodium hydroxide or potassium hydroxide or even tertiary amines such as triethylamine.

The dehydrating agent which is reacted with N-[β-3'-indolyl) ethyl] 2-oxopiperidine of Formula II is preferably phosphorus oxychloride; it is equally possible to use other dehydrating agents such as aluminum chloride, phosphorus pentachloride, phosphoric anhydride or thionyl chloride. As an organic base in the presence of which this reaction occurs, one can use, notably, a tertiary amine, such as trimethylamine, triethylamine, N-methylpiperidine, pyridine, N-methyl-pyrrolidine, quinoline, or N,N-dimethyl aniline.

The mineral base with which one treats the salt of 1,2,3,4,6,7-hexahydro 12H-indolo [2,3a] quinolizinium of general Formula III is preferably ammonia.

It is also possible to use an alkali metal hydroxide such as potassium hydroxide or sodium hydroxide for this treatment.

The basic agent in the presence of which is effected the treatment of 1-benzoyloxy 2,3,4,6,7,12-hexahydro indolo [2,3a] quinolizine of Formula V with the phosphonoacetic ester of general Formula VI is preferably sodium hydride. One can also bring about this reaction in the presence of an alkali metal alcoholate such as sodium methylate, sodium t-butylate, sodium t-amylate or even in the presence of an alkali metal amide such as sodium amide. It is well understood that in this reaction, of a type belonging to the Wittig-Horner Reaction, it is possible to use in place of the phosphono-acetic ester of general Formula VI, all the reagents utilized in similar cases and notably a carbalkoxy methylene - triphenyl-phosphorane.

In that which concerns the last stage of the process of this invention, namely the preparation of (±) eburnamonine apart from the alkyl 1,2,3,4,6,7,12,12b E octahydro-indolo [2,3a] quinolizylidene acetate of general Formula VII, it should be noted that it was not attempted to isolate the classical 1,4-addition compound of an ethyl anion on a conjugated system, but rather to benefit from the reaction conditions in order to obtain directly the compound of cyclisation.

It will also be noted that this reaction makes it possible to obtain selectively the cis derivative at the junction of rings D and E.

The example which follows illustrates the invention without limiting it in any way.

EXAMPLE

Stage A: N-[β(3'-indolyl) ethyl]-2-oxo piperidine

One introduces 16 g. of tryptamine and 21 g. of ethyl 5-bromovalerate (described in Beilstein, volume 2, second supplement, page 269) into 500 cc. of n-butanol. There is then added 15.5 g. of potassium carbonate and the mixture is stirred at reflux under a nitrogen atmosphere for 9 hours. It is allowed to stand at ambient temperature overnight with stirring and then filtered. The filtrate is concentrated to dryness under reduced pressure. The residue is taken up in benzene and the benzene extracts are washed with a 10% aqueous solution of acetic acid, then with water. They are dried and concentrated to dryness by distillation under reduced pressure. The product obtained is purified by grinding with benzene. After drying there is obtained 14.3 g. of N-[β(3'-indolyl) ethyl]-2-oxo piperidine. M.P. 156–158° C.

Analysis: $C_{15}H_{18}N_2O$=242.322. Calculated (percent): N, 11.5. Found (percent): N, 11.4.

Stage B: 1,2,3,4,6,7-hexahydro 12H-indolo [2,3a] quinolizinium perchlorate

One introduces 10 g. of N-[β(3'-indolyl)ethyl] 2-oxo piperidine into 10 cc. of N-dimethyl aniline then adds dropwise at 10° C. 20 cc. of phosphorus oxychloride. The mixture is stirred under nitrogen for two hours. 60 cc. of acetone is added progressively and the mixture is poured rapidly dropwise with stirring into 750 cc. of ice water containing 20 cc. of perchloric acid (55° Bé.), stirred 30 minutes at 0° C., then drained, washed with water, drained and dried under reduced pressure. There is thus obtained 13 g. of 1,2,3,4,6,7-hexahydro 12H-indolo [2,3a] quinolizinium perchlorate. M.P. 228° C. (identical to the product described by Wenkert et al., J. Am. Chem. Soc., 84, 4914 (1962).

Stage C: 2,3,4,6,7,12-hexahydro indolo [2,3a] quinolizine

One introduces 13 g. of 1,2,3,4,6,7-hexahydro 12H-indolo [2,3a] quinolizinium perchlorate into a mixture of 130 cc. of ethanol and 130 cc. of water. The mixture is cooled to 10° C. and 130 cc. of aqueous ammonia (22° Bé.) is added over 5 minutes under nitrogen with stirring. The stirring is continued for 30 minutes at ambient temperature, always protected from light, then cooled between 0° C. and 5° C. and added over 10–15 minutes 1.3 of ice water. The mixture is then cooled for an hour at 0° C. with stirring and keeping protected from light, then drained, washed with water and dried under reduced pressure. There is thus obtained 8.9 g. of 2,3,4,6,7,12-hexahydro indolo [2,3a] quinolizine (identical to the product described by Dolby et al., J. Org. Chem., 32, 1391 (1967).

Stage D: 1-benzoyloxy 2,3,4,6,7,12-hexahydro indolo [2,3a] quinolizine 1.4 g. of hydroquinone is introduced into 160 cc. of dioxane, then, after solution is complete, there is added all at once 14.4 g. of 2,3,4,6,7,12-hexahydro indolo [2,3a] quinolizine. The temperature is stabilized at 20° C. and then there is added over an hour a solution of 18.24 g. of dibenzoyl peroxide in 160 cc. of dioxane. The mixture is stirred for 30 minutes at 25° C. then poured into 4 l. of ice water containing 160 cc. of aqueous ammonia (22° Bé.). The mixture is allowed to stand two hours at 0° C., then it is filtered, washed with water and dried under vacuum. There is thus obtained 16.9 g. of 1-benzoyloxy 2,3,4,6,7,12-hexahydro indolo [2,3a] quinolizine.

Analysis: $C_{22}H_{20}N_2O_2$=344.416. Calculated (percent): N, 8.14. Found (percent): N, 8.1.

Stage E: ethyl 1,2,3,4,6,7,12,12b E octahydro indolo [2,3a] quinolizylidene acetate Into 24 cc. of 1,2-dimethoxy ethane is introduced 0.576 g. of 50% sodium hydride in vaseline oil. The mixture is cooled to 15° C. and a solution of 2.688 g. of triethyl phosphonoacetate (described in Beilstein, volume 4, second supplement, page 976) in 6 cc. of 1,2 - dimethoxy ethane is added over 30 minutes. The temperature is allowed to return to ambient conditions and the mixture is stirred for 30 minutes. The mixture is then cooled between 0° C. and 5° C. and 1.36 g. of 1-benzoyloxy 2,3,4,6,7,12-hexahydro indolo [2,3a] quinolizine is added. The temperature is then allowed to return to ambient conditions and the mixture stirred one hour at 20–25° C. The mixture is then heated rapidly to 40–45° C. and stirred an hour under nitrogen atmosphere at this temperature. The mixture is cooled to between 0° C. and 5° C. and 4 cc. of ice water is added. It is then poured into water and extracted with methylene chloride. The extracts are washed with water, dried and evaporated to dryness. There is thus obtained 2.2 g. of the desired product in the form of a black resin that is submitted to chromatography on silica (eluant: chloroform-ethyl acetate-ethanol (65/30/5)). There is thus obtained 205 mg. of ethyl 1,2,3,4,6,7,12,12b E octahydro indolo [2,3a] quinolizylidene acetate. After recrystallization from diethyl ether, the product melts at 158–160° C.

Stage F: (±) Eburnamonine

There is mixed under nitrogen atmosphere at 25° C., 4.30 cc. of 0.95 M ethyl magnesium bromide in tetrahydrofuran and 20 mg. of cuprous chloride. The mixture is stirred for 10 minutes and cooled to −10° C. and a solution of 412 mg. of ethyl 1,2,3,4,6,7,12,12b E octahydro indolo [2,3a] quinolizylidene acetate in 4 cc. of tetrahydrofuran in added over 15 minutes. The resultant mixture is kept one hour at −10° C., then for 30 minutes at 0° C., and finally poured with stirring into a solution of 500 mg. of ammonium chloride in 20 cc. of water, stirred, then extracted with methylene chloride. The extracts are washed with water, dried and the solvent evaporated. The residue is then submitted to chromatography on silica. Eluent: chloroform-ethyl acetate-ethanol (60/30/10). There is thus obtained 140 mg. of product which is purified by making a paste with pure alcohol. After drying there is obtained 120 mg. of pure racemic eburnamonine, M.P. 204° C. (identical to the product described by Bartlett et al., J. Am. Chem. Soc., 82, 5941 (1960).

What is claimed is:
1. A process for preparing (±) eburnamonine which comprises the steps of:
(a) condensing an alkyl 5-halovalerate of the formula X—$(CH_2)_4CO_2R_1$
wherein X is either chlorine or bromine and $R_1$ is an alkyl radical containing from 1 to 4 carbon atoms, in alcohol with tryptamine in the presence of a basic agent to yield N-[β-(3'-indolyl) ethyl] 2-oxo piperidine of the formula

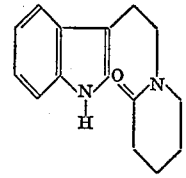

(b) subjecting the product of (a) to the action of a dehydrating agent in the presence of an organic base, then to the action of a strong acid of the formula HX′, wherein X′ is an anion selected from $ClO_4^\ominus$, $Cl^\ominus$, and $Br^\ominus$ to give the corresponding 1,2,3,4,6,7-hexahydro 12H-indolo [2,3a] quinolizinium salt of the formula

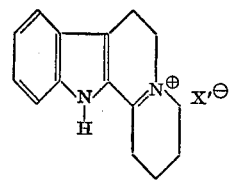

(c) treating the product of (b) with a mineral base to give 2,3,4,6,7,12-hexahydro indolo [2,3a] quinolizine of the formula

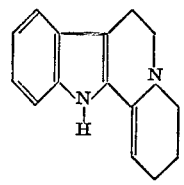

(d) subjecting the product of (c) to the action of dibenzoyl peroxide in the presence of hydroquinone, then subjecting the resulting compound to the action of a mineral base to give 1-benzoyloxy 2,3,4,6,7,12-hexahydro indolo [2,3a] quinolizine of the formula

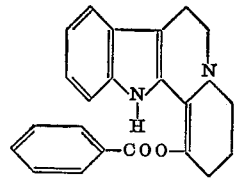

(e) treating the product of (d) in the presence of a basic agent with a phosphonoacetic ester of the formula

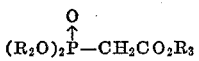

in which $R_2$ and $R_3$ are alkyl radicals containing from 1 to 4 carbon atoms to give an alkyl 1,2,3,4,6,7,12, 12b E octahydro indolo [2,3-a] quinolizylidene acetate of the formula

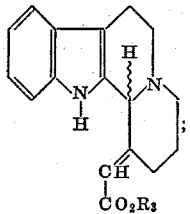

and (f) treating the product of (e) with an ethyl magnesium halide in the presence of cuprous chloride to give the desired (±) eburnamonine.

2. A process for preparing the salt of a strong acid of 1,2,3,4,6,7-hexahydro 12H-indolo [2,3a] quinolizinium of the formula

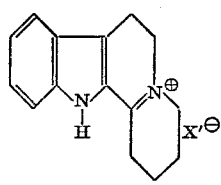

wherein $X'^{\ominus}$ is an anion seelcted from $ClO_4^{\ominus}$, $Cl^{\ominus}$, and $Br^{\ominus}$, which comprises the steps of:

(a) condensing an alkyl 5-halovalerate of the formula $$X-(CH_2)_4CO_2R_1$$

wherein X is chlorine or bromine and $R_1$ is an alkyl residue containing from 1 to 4 carbon atoms, in alcohol with tryptamine in the presence of a basic agent to give N-[β-(3'-indolyl) ethyl] 2-oxo piperidine of the formula

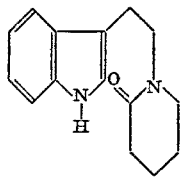

(b) subjecting the product of (a) to a dehydrating agent in the presence of an organic base, and then to the action of a strong acid of the formula HX', where X' is as defined above, to give the desired product.

3. Process for preparing (±) eburnamonine which comprises the steps of (a) submitting 2,3,4,6,7,12-hexahydro indolo [2,3a] quinolizine of the formula

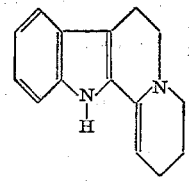

to the action of dibenzoyl peroxide in the presence of hydroquinone, then submitting the resulting compound to the action of a mineral base to give 1-benzoyloxy 2,3,4,6,7,12-hexahydro indolo [2,3a] quinolizine of the formula

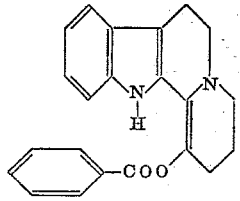

(b) treating the product of (a) in the presence of a basic agent with a phosphonoacetic ester of the formula:

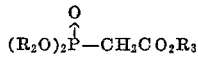

wherein $R_2$ and $R_3$ are alkyl radicals containing from 1 to 4 carbon atoms to give an alkyl 1,2,3,4,6,7,12,12b E octahydro indolo [2,3a] quinolizylidene acetate of the formula

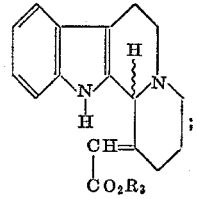

and (c) treating the product of (b) with an ethyl magnesium halide in the presence of cuprous chloride to give the desired product.

4. N-[β-(3'-indolyl) ethyl] 2-oxo piperidine.

5. 1-benzoyloxy 2,3,4,6,7,12-hexahydro indolo [2,3a] quinolizine.

6. Ethyl 1,2,3,4,6,7,12,12b E octahydro indolo [2,3a] quinolizylidene acetate.

References Cited

Bartlett et al., J. Am. Chem. Soc. 82, 5941-6 (1960).

HENRY R. JILES, Primary Examiner

G. T. TODD, Assistant Examiner

U.S. Cl. X.R.

260—293.61, 295 A, 296 P, 999